United States Patent
Schäuble et al.

(10) Patent No.: US 11,956,093 B2
(45) Date of Patent: Apr. 9, 2024

(54) FIELD DEVICE ADAPTER FOR WIRELESS DATA TRANSFER

(71) Applicant: Endress+Hauser SE+Co. KG, Maulburg (DE)

(72) Inventors: Harald Schäuble, Lörrach (DE); Dirk Lill, Freiburg (DE); Ralph Stib, Schönau (DE); Matthias Studer, Berikon (CH); Markus Döbeli, Geroldswil (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 17/905,459

(22) PCT Filed: Mar. 1, 2021

(86) PCT No.: PCT/EP2021/055056
§ 371 (c)(1),
(2) Date: Sep. 1, 2022

(87) PCT Pub. No.: WO2021/175787
PCT Pub. Date: Sep. 10, 2021

(65) Prior Publication Data
US 2023/0123468 A1    Apr. 20, 2023

(30) Foreign Application Priority Data
Mar. 3, 2020  (DE) .................... 10 2020 105 605.2

(51) Int. Cl.
*H04L 12/28*  (2006.01)
*H02H 9/02*   (2006.01)
*H02H 9/04*   (2006.01)

(52) U.S. Cl.
CPC ........... *H04L 12/2801* (2013.01); *H02H 9/02* (2013.01); *H02H 9/04* (2013.01)

(58) Field of Classification Search
CPC .... G05B 19/41; G05B 19/042; G05B 19/418; G08C 17/00; H02H 9/02; H02H 9/04;
(Continued)

(56) References Cited

U.S. PATENT DOCUMENTS 9,768,641 B2    9/2017  Fiedler et al.
2020/0186196 A1*  6/2020  Schäuble ................. H04Q 9/00

FOREIGN PATENT DOCUMENTS

DE       10049994 A1   4/2002
DE    102013103454 A1  10/2014
(Continued)

*Primary Examiner* — Shawkat M Ali
(74) *Attorney, Agent, or Firm* — Mark A. Logan; Endress+Hauser (USA) Holding, Inc.

(57) ABSTRACT

A field device adapter for wireless data transfer, comprises at least: an adapter housing; an adapter electronics unit arranged in the adapter housing, the adapter electronics unit comprising a first supply circuit, which is introduced into the first connection line, for providing a first supply voltage from a loop current flowing in the first connection line, and a second supply circuit, which is introduced into the second connection line, for providing a second supply voltage from the loop current flowing in the second connection line, wherein the adapter electronics unit further comprises a HART modem and a wireless module with an antenna for transmitting and/or receiving, and the adapter electronics unit is configured such that the first supply circuit supplies the HART modem with the first supply voltage, and the second supply circuit supplies the wireless module with the second supply voltage.

14 Claims, 3 Drawing Sheets

(58) Field of Classification Search
CPC ... H04B 1/00; H04B 1/04; H04B 1/06; H04B 1/38; H04B 3/54; H04Q 9/00
USPC ........ 307/1, 12, 64; 375/219, 222, 252, 295, 375/316; 714/40
See application file for complete search history.

(56) References Cited

FOREIGN PATENT DOCUMENTS

| | | |
|---|---|---|
| DE | 102017114851 A1 | 1/2019 |
| DE | 102018120108 A1 | 2/2020 |
| EP | 2307934 A1 | 4/2011 |
| EP | 3008530 A1 | 4/2016 |
| WO | 2019007668 A1 | 1/2019 |

\* cited by examiner

FIELD DEVICE ADAPTER FOR WIRELESS DATA TRANSFER

CROSS-REFERENCE TO RELATED APPLICATIONS

The present application is related to and claims the priority benefit of DPMA Patent Application No. 10 2020 105 605.2, filed on Mar. 3, 2020, and International Patent Application No. PCT/EP2021/055056, filed on Mar. 1, 2021, the entire contents of which are incorporated herein by reference.

TECHNICAL FIELD

The invention relates to a field device adapter for wireless data transfer and to a system of automation technology for capturing and/or setting a process variable.

BACKGROUND

In automation engineering, in particular in process automation, field devices which serve for the determination, optimization, and/or influencing of process variables are widely used. Sensors, such as fill-level measuring devices, flow meters, pressure and temperature measuring devices, conductivity measuring devices, etc., are used for capturing the respective process variables, such as fill-level, flow rate, pressure, temperature, and conductivity. Actuators, such as, for example, valves or pumps, are used to influence process variables. The flow rate of a fluid in a pipeline section or a fill-level in a container can thus be altered by means of actuators. Field devices, in principle, refer to all devices that are used in-process and that supply or process process-relevant information. In the context of the invention, field devices also refer to remote I/O's (electrical interfaces), radio adapters, and/or, in general, devices that are arranged at the field level.

A variety of such field devices are manufactured and marketed by the Endress+Hauser company.

Two-wire field devices, which are connected via a two-wire line to a higher-level unit, e.g., a control unit PLC, are still common at the present time in a large number of existing automation systems. Two-wire field devices are designed in such a way that measurement or control values as a main process variable are communicated, i.e., transmitted, in analog form via the two-wire line or two-wire cable as a 4-20 mA signal. The HART protocol, in which a frequency signal is superimposed on the analog current signal of 4-20 mA as a digital two-wire signal for data transfer, has in particular proven successful for transferring all other data. According to the HART protocol, there is a switch between 1,200 Hz and 2,200 Hz for data transmission, wherein the lower frequency stands for a logical "1" and the higher frequency for a logical "0." In this way, the analog current signal, which changes only slowly, remains unaffected by the frequency superposition, so that, by means of HART, analog and digital communication are combined.

In the course of increasing digitization, however, it is desirable that the data be able to be transferred not only via the two-wire line, i.e., purely by wire, but also communicated wirelessly. This may be to transfer the data wirelessly to a database, e.g., a cloud database, and make it available there, or to transfer data wirelessly between the field device and a mobile control unit, e.g., in order to parametrize the field device wirelessly via the mobile control device.

SUMMARY

It is thus an object of the invention to propose a possibility by means of which existing field devices, which are actually designed for exclusively wire-bound data transfer, can be retrofitted for wireless data communication.

The field device adapter according to the invention for wireless data transfer comprises at least:
an adapter housing having a first end and a second end, wherein the first end has a first connection element and a second connection element for electrically connecting to a field device electronics unit of a field device, and the second end has a third connection element and a fourth connection element for electrically connecting a two-wire line;
an adapter electronics unit, arranged in the adapter housing, which connects the first connection element to the third connection element through a first electrical connection line and the second connection element to the fourth connection element through a second electrical connection line, wherein the adapter electronics unit comprises a first supply circuit, preferably unregulated or non-regulated and installed in the first connection line, for providing a first supply voltage from a loop current flowing in the first connection line, and a second supply circuit (15b), preferably unregulated or non-regulated and installed in the second connection line, for providing a second supply voltage from the loop current flowing in the second connection line, wherein the adapter electronics unit further comprises a HART modem, based upon a HART protocol, which is connected to the second connection line at least via a tapping point arranged in the second connection line, and is configured to tap a two-wire signal modulated onto the loop current and to convert it into a signal, preferably a UART signal, and/or to convert a supplied signal, preferably a UART signal, into a two-wire signal, and to modulate the converted signal via the tapping point onto the loop current, wherein the adapter electronics unit in addition comprises a wireless module with an antenna for transmitting and/or receiving and is configured to transmit as a wireless signal the signal, preferably a UART signal, converted and supplied by the HART modem and/or to receive a wireless signal which is to be converted into a two-wire signal by the HART modem and to supply it as a signal, preferably a UART signal, to the HART modem, wherein the adapter electronics unit is configured such that the first supply circuit supplies the HART modem with the first supply voltage, and the second supply circuit (15b) supplies the wireless module with the second supply voltage, preferably independently of each other.

According to the invention, a field device adapter is proposed which has two internal supply circuits, wherein one of the two supply circuits supplies a HART modem with energy, and the other of the two supply circuits supplies a wireless module with energy.

Data, for example, can be transferred via the field device adapter to a cloud database. For the purposes of the present invention, a cloud database is to be understood as a database which can be contacted by a user via the internet. In this case, provision can be made for the database to have an application, e.g., for visualizing the data which are stored in the database. From his device, e.g., a PC or a mobile terminal, a user can access the database application, and thus the data, via the internet.

The operation of a "proprietary" field device, which does not actually have a wireless module, is also possible via the wireless adapter connected to the field device.

An advantageous embodiment of the field device adapter according to the invention provides that the adapter electronic unit further have a galvanic separation which galvanically separates the HART modes from the wireless module, and the HART modem and the wireless module communicate at least the signal via the galvanic separation.

A further advantageous development of the field device adapter according to the invention provides that the HART modem (17) be configured as a primary or secondary master according to the HART protocol.

A further advantageous development of the field device adapter according to the invention provides that the adapter electronics unit further have at least one communications resistor installed in the first connection line between the first supply circuit and the third connection element.

An alternative development of the field device adapter according to the invention provides that the adapter electronics unit (14) further have at least one communications resistor (18) installed in the second connection line (26) between the second supply circuit (15b) and the fourth connection element (11b).

A further advantageous development of the field device adapter according to the invention provides that the wireless module be further configured to transmit and/or receive the radio signal according to one of the following wireless protocols:

a Bluetooth protocol or a variant derived therefrom,
a 6LoWPAN protocol,
a WirelessHART protocol, and/or
a 6TiSCH protocol.

A further advantageous development of the field device adapter according to the invention provides that the adapter electronics unit further have EMC measures which are designed such that at least the first and/or second supply circuits are protected against EMC interference.

A further advantageous development of the field device adapter according to the invention provides that the adapter electronics unit further have explosion-protection measures, wherein the explosion-protection measures include current-limiting explosion-protection measures and/or voltage-limiting measures. In particular, the development can provide that the voltage-limiting measures comprise at least one current shunt regulator, in particular a higher-current shunt regulator, which is connected in parallel with the first and/or the second supply circuits, and/or that the current-limiting measures comprise at least one resistor which is connected between the first supply circuit (15a) and the HART modem and/or between the second supply circuit and the wireless module.

A further advantageous development of the field device adapter according to the invention provides that the first end of the adapter housing (7) be further designed such that the first end is a closed end, so that the field device adapter and the field device form two mechanical units separate from each other.

An alternative development of the field device adapter according to the invention provides that the first end of the adapter housing be further designed such that the field device adapter can be mechanically connected to a field device, preferably to a cable gland connection of a field device, and particularly preferably to an M20 cable gland connection of the field device, so that the field device adapter and the field device form a mechanically connected unit.

A further advantageous development of the field device adapter according to the invention provides that the first and/or second supply circuits each have at least one current shunt regulator, in particular a higher-current shunt regulator, or at least one diode each, preferably in each case at least one z-diode, which is designed to have a fixed value for the first or second supply voltage.

The invention further relates to a system of automation technology for capturing and/or setting a process variable, having:

a first two-wire line for transferring a loop current with a modulated two-wire signal;
a field device of automation technology with a field device housing which has at least one housing opening, wherein the field device further comprises a field device electronics unit arranged within the field device housing, said field device electronics unit being designed to communicate data, in particular the process variable, in the form of two-wire signals, in particular two-wire signals based upon a HART protocol;
a field device adapter according to a previously described development.

BRIEF DESCRIPTION OF THE DRAWINGS

The invention is explained in more detail on the basis of the following drawings. The following are shown.

DETAILED DESCRIPTION

Figure 1:
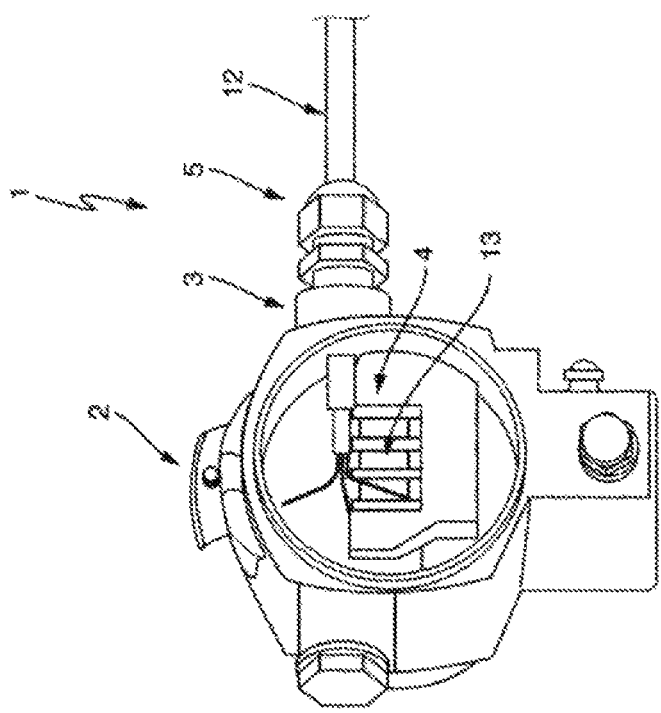
FIG. 1 shows a schematic representation of a two-wire field device, as is currently found in a large number of existing automation systems and with which data can be communicated exclusively by wire via a two-wire line.

FIG. 1 shows schematically a two-wire field device which comprises a metallic housing 2 within which a field device electronics unit 4 is arranged. The field device electronics unit 4 is designed in such a way as to have connection terminals 13 via which a two-wire line 12 is electrically connected. Via the two-wire line, the field-device electronics unit 4 and thus the field device 1 are connected to a higher-level unit 31, not shown separately in FIG. 1, in order to communicate data by wire with the higher-level unit 31. In this case, the measurement or control values as the main process variable are communicated analogously in the form of a 4-20 mA current signal via the two-wire line 12, and all other data are transmitted in the form of a digital two-wire signal according to the HART standard.

To enable the two-wire line 12 coming from outside the housing 2 to be put into electrical contact with the field device electronics unit 4 arranged in the housing 2, the metallic housing 2 has a housing opening 3. A cable gland 5 is introduced into the housing opening 3 so that the two-wire line 12 can be introduced into the housing 2 through the cable gland 5. The cable gland 5 preferably takes the form of a PG cable gland, i.e., a cable gland with a heavy-gauge steel conduit thread, in accordance with the DIN EN 62444 standard published in May 2014. The cable gland 5 can, for example, take the form of an M20 PG cable gland, i.e., having an outer diameter of 20 mm.

Figure 2:
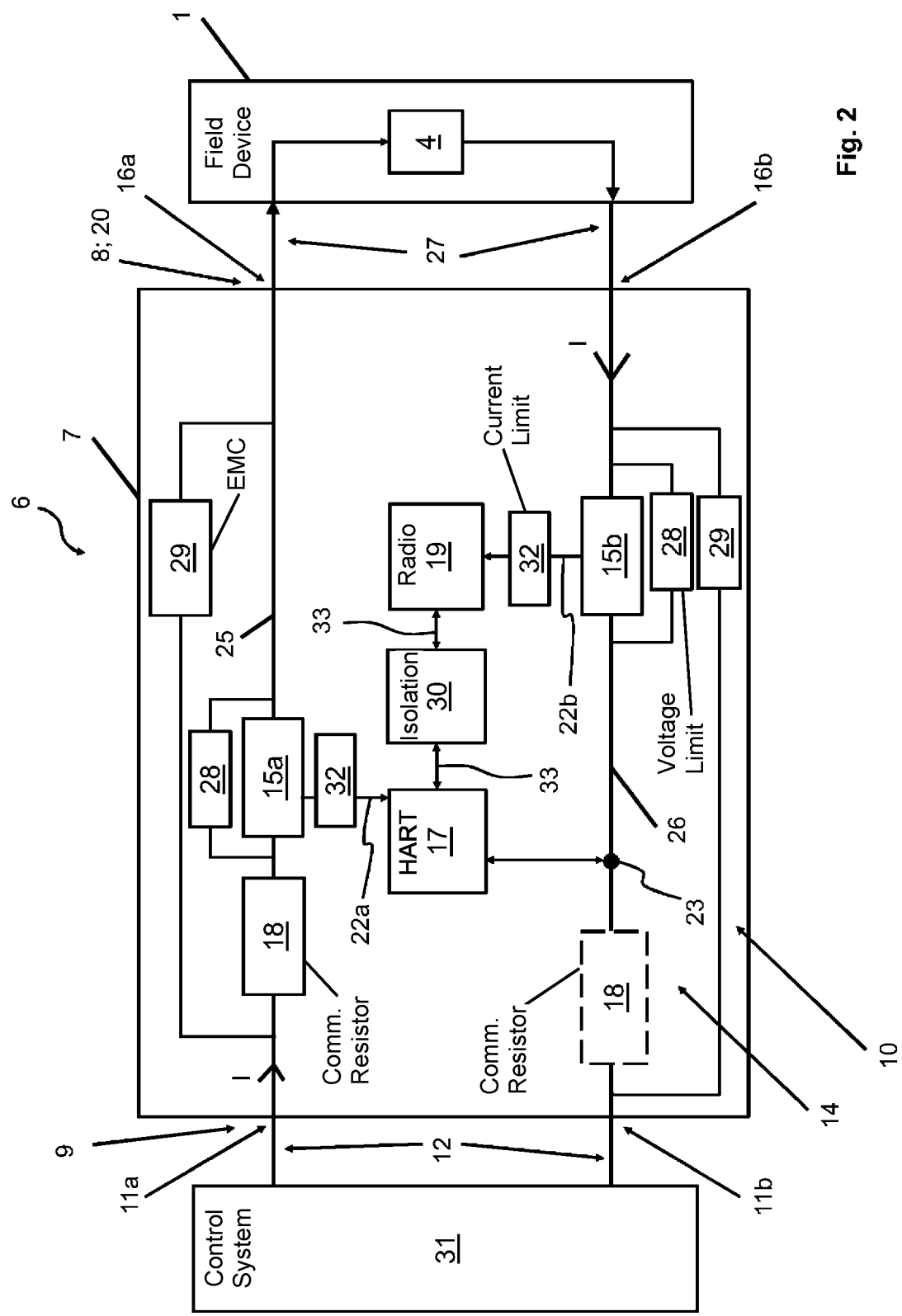
FIG. 2 shows a schematic representation of a field device adapter according to the present disclosure.

FIG. 2 shows a schematic representation of a field device adapter 6 according to the invention. The field device adapter 6 has an adapter housing 7 with an adapter chamber 10. The adapter housing 7 is designed in such a way that the field device adapter 6 can be mechanically fastened at a first end 8 to a cable gland 5, in particular to a PG cable gland, of a field device 1. For this purpose, the first end 8 of the adapter housing preferably has an M20 thread, via which the adapter can be mechanically screwed to the cable gland of the field device. In particular, the first end 8 may be so designed that it can be connected to a PG cable gland with an M20 thread, according to the standard DIN EN 62444 published in May 2014, of a field device.

For electrical contacting, the field device adapter 6 has a first and a second connection element 16*a* and 16*b* at its first end 8. The first and second connection elements 16*a* and 16*b* can each comprise an electrical connection or connection line for electrical connection to a field device electronics unit 4. In particular, the connection can be made via a two-wire line 27.

At a second end 9 opposite the first end 8, the adapter housing 7 is designed in such a way that a two-wire line 12 for data transmission to the field device adapter 6 can be electrically connected via a third and a fourth connection element 11*a*, 11*b*. For electrically connecting the two-wire line 12, the third and fourth connection elements 11*a* and 11*b* can comprise, for example, a connection terminal.

Furthermore, the field device adapter 6 has, arranged within the adapter chamber, an adapter electronics unit 14, which connects the first connection element 16*a* to the third connection element 11*a* via a first electrical connection line 25 and the second connection element 16*b* to the fourth connection element 11*b* via a second electrical connection line 26. Via the first electrical connection line 25, a loop current I is fed from the two-wire line 12 to the field device electronics unit 4, and, via the second electrical connection line 26, the loop current I is fed back to the two-wire line 12 connected to the field device adapter 6. The adapter electronics unit 14 is therefore configured to communicate in both directions digital two-wire signals, which are designed according to the HART standard, between the two-wire line 12 connected via the third and fourth connection elements and the field device electronics unit 4 connected via the first and second connection elements 16*a*, 16*b*.

For the autonomous energy supply of the field device adapter 6, the adapter electronics unit 14 has a first supply circuit 15*a* and a second supply circuit 15*b*, which in each case provide a first or a second supply voltage. The supply circuits 15*a*, 15*b* are preferably designed to be independent of one another and separated from one another by a galvanic separation 30. The supply circuits 15*a*, 15*b* can each have a Z-diode or Zener-diode, which are installed in the first or second connection line in such a way that they are each connected in the reverse direction to the loop current flowing through the first or second connection line, and a voltage tap can be made in each case as a supply voltage via the diode.

Alternatively, the first and/or second supply circuits 15*a* and 15*b* can each have at least one current shunt regulator, in particular a higher-current shunt regulator, which are each designed and installed in the first or second connection line in such a way that a fixedly settable first or second supply voltage is generated in each case.

The adapter electronics unit 14 also has a wireless module 19 with an antenna for transmitting or receiving radio signals and a HART modem 17 for converting the digital two-wire signal. According to the invention, the wireless module 19 is supplied with energy by one of the two supply circuits, and the HART modem 17 is supplied with energy by the other supply circuit. According to the exemplary embodiment shown in FIG. 2, the first supply circuit 15*a* supplies the HART modem 17 with the first supply voltage, and the second supply circuit 15*b* supplies the wireless module 19 with the second supply voltage.

The radio unit 19 is designed in such a way that, in particular, radio signals in accordance with a Bluetooth protocol or variant derived therefrom, a 6LoWPAN protocol, a WirelessHART protocol, and/or a 6TiSCH protocol can be transmitted.

In order to be able to tap the digital two-wire signals communicated on the connected two-wire line 12 or to modulate them onto the loop current I, the adapter electronics unit 14 has a tapping point 23 installed in the second connection line 26. The tapping point 23 is preferably installed between the second supply circuit 15*b* installed in the second connection line 26 and the fourth connection element 11*b*. Furthermore, the adapter electronics unit 14 is designed in such a way that the wireless module 19 and the HART modem 17 can communicate with one another—for example, via a UART interface 33. In this way, the radio signals received by the wireless module 19 can be transmitted via the UART interface 33 to the HART modem 17 and converted by the HART modem 17 into corresponding digital two-wire signals, which can in turn be modulated onto the loop current via the tapping point 23. The digital two-wire signals communicated on the loop current can likewise be tapped by the HART modem at the tapping point 23 and converted by the HART modem 17 into UART signals, which are in turn transmitted via the UART interface 33 to the wireless module 19 and are transmitted by the latter as radio signals.

In order to form the two supply circuits located in the different connection lines independently of one another, the adapter electronics unit can have a galvanic separation, via which only the data between the wireless module and the HART modem are communicated.

So that the adapter electronics unit 14 can tap the digital two-wire signals via the tapping point 23 or modulate onto the loop current I, a communications resistor 18 is also provided in the first electrical connection line 25. In this case, the communications resistor 18 can be installed between the first supply circuit 15*a* and the third connection element 11*a* in the first electrical connection line 25.

Alternatively, the communications resistor 18 can also be installed in the second connection line 26 between the second supply circuit and the fourth connection element. In FIG. 2, this is indicated by way of example by the dashed resistor. It goes without saying that in this case there is no communications resistor in the first connection line 25.

So that the adapter electronics unit 14 can communicate digital two-wire signals to the field device 1, the HART modem 17 is preferably configured as a secondary master. In this way, for example, a field device 1 can be parametrized wirelessly via radio signals that are received by the wireless module 19 of the field device adapter 6 and converted into corresponding digital two-wire signals by the HART modem 17.

Alternatively, the HART modem 17 can also be configured as a primary master. This can be useful, for example, if only one higher-level unit 31 without HART communication means is present, and thus no other primary master is present. In this case, e.g., for parameterizing the field device, the adapter electronics unit 14 can communicate with the field device electronics unit 4 via the two-wire line 27 by means of HART.

In addition, the adapter electronics unit 14 can have EMC measures 29 which are designed such that at least the first and/or second supply circuits 15a, 15b are protected from EMC interference.

The EMC measures can have in particular one or more suppressor diodes which are connected in parallel at least to the first or second supply circuit. Depending upon the connection line in which the communications resistor is arranged, the suppressor diode is connected in parallel with the supply circuit, located in this supply line, and the communications resistor.

Additionally or alternatively, the adapter electronics unit 14 can also have explosion-protection measures 28, 32. These can include, in particular, current-limiting explosion-protection measures 32 and/or voltage-limiting explosion-protection measures 28. For example, the current-limiting explosion-protection measures can comprise resistors which have been installed in a line between the first supply circuit and the HART modem 22a and/or into a line between the second supply circuit and the wireless module 22b for the respective voltage supply. The voltage-limiting explosion-protection measures can comprise at least one current shunt regulator, in particular a higher-current shunt regulator, which is connected in parallel with the first and/or the second supply circuits 15a, 15b.

Figure 3:
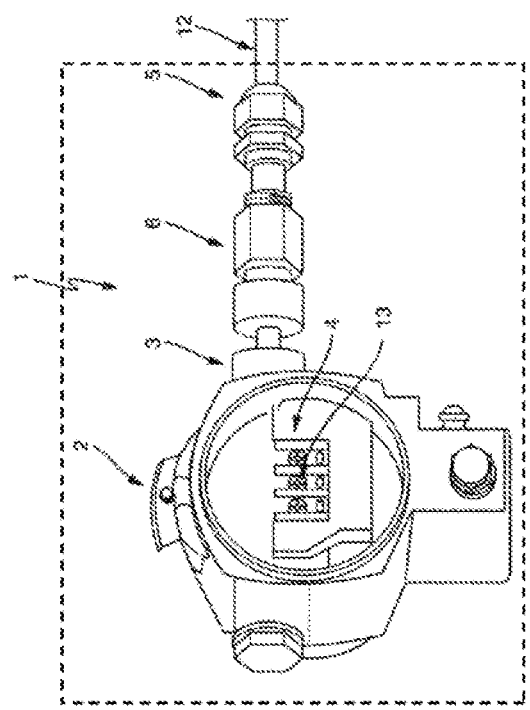
FIG. 3 shows a schematic representation of a field device to which a field device adapter is mechanically attached, so that the field device and the field device adapter form a mechanically connected unit.

FIG. 3 shows a schematic representation of a field device 1, to which a field device adapter 6 is mechanically attached at its first end 8, so that the field device 1 and the field device adapter 6 form a mechanically connected unit. As shown in FIG. 3, the field device adapter 6 can here be arranged in such a way that it is located between the housing opening 3 of the field device 1 and the cable gland 5 actually belonging to the housing opening of the field device. In this case, the adapter housing 7 is designed such that the cable gland 5 can be fastened to or screwed onto the correspondingly designed second end 9. For example, the second end 9 can also take the form of a PG cable gland with an M20 thread in accordance with the DIN EN 62444 standard published in May 2014.

Alternatively, the field device adapter 6 can also be designed in such a way that the adapter housing 7 serves as a cable gland, and thus, when it is fitted to the field device 1, no separate cable gland is required.

In both cases, the field device 1 and the field device adapter mechanically attached to the housing opening 3 of the field device 1 form a mechanically connected unit.

Figure 4:
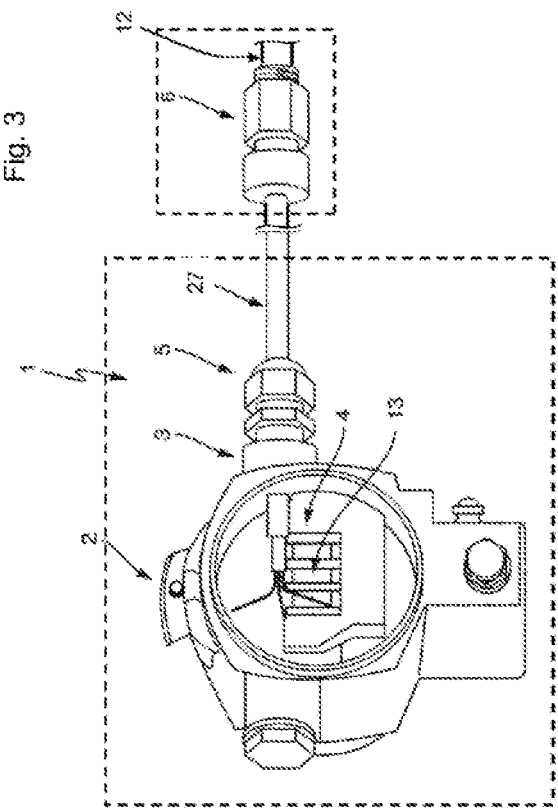
FIG. 4 shows a schematic representation of a field device and a field device adapter, each of which forms a separate unit and are electrically connected to one another via a connection line.

In contrast to this, FIG. 4 shows a schematic representation of a field device 1 and a field device adapter 6, which in each case form a separate mechanical unit and are electrically connected to one another via a connection line, in particular a second two-wire line 27. Due to the fact that the field device adapter 6 is electrically connected to the field device 1 only via the connection line 27 and not via a mechanical connection, the field device adapter 6 can be placed flexibly in an automation system, so that it can be set up quasi-independently of the installation location of the field device 1.

The invention claimed is:

1. A field device adapter for wireless data transfer, the field device adapter comprising:
    an adapter housing having a first end and a second end, wherein the first end has a first connection element and a second connection element for electrically connecting to a field device electronics unit of a field device, and the second end has a third connection element and a fourth connection element for electrically connecting a two-wire line; and
    an adapter electronics unit arranged in the adapter housing, the adapter electronics unit including:
        a first electrical connection line connecting the first connection element to the third connection element;
        a second electrical connection line connecting the second connection element to the fourth connection element;
        a first supply circuit installed in the first electrical connection line for providing a first supply voltage from a loop current flowing in the first electrical connection line;
        a second supply circuit installed in the second electrical connection line for providing a second supply voltage from the loop current flowing in the second electrical connection line;
        a Highway Addressable Remote Transducer (HART) modem based upon a HART standard, wherein the HART modem is connected to the second electrical connection line via a tapping point arranged in the second electrical connection line and wherein the HART modem is configured to: tap a first two-wire signal modulated on the loop current and convert the first two-wire signal into a first universal asynchronous receiver transmitter (UART) signal; convert a supplied second UART signal into a second two-wire signal; and, via the tapping point, modulate the converted second two-wire signal onto the loop current; and
        a wireless module with an antenna for transmitting and receiving, wherein the wireless module is configured to: transmit as a first wireless signal the converted first UART signal supplied by the HART modem; receive a second wireless signal that is to be converted into the second two-wire signal by the HART modem; and supply the received second wireless signal as the second UART signal to the HART modem,
        wherein, in the adapter electronics unit, the first supply circuit is configured to supply the HART modem with the first supply voltage, the second supply circuit is configured to supply the wireless module with the second supply voltage, and the first supply circuit and the second supply circuit are configured to operate independently of each other.

2. The field device adapter according to claim 1, wherein the adapter electronics unit further includes a galvanic separation that galvanically separates the HART modem from the wireless module, and the HART modem and the wireless module communicate at least the UART signal via the galvanic separation.

3. The field device adapter according to claim 2, wherein the adapter electronics unit further includes at least one communications resistor installed in the first electrical connection line between the first supply circuit and the third connection element.

4. The field device adapter according to claim 2, wherein the adapter electronics unit further includes at least one communications resistor installed in the second electrical connection line between the second supply circuit and the fourth connection element.

5. The field device adapter according to claim 1, wherein the HART modem is configured as a primary or secondary master according to the HART standard.

6. The field device adapter according to claim 1, wherein the wireless module is further configured to send the first wireless signal and receive the second wireless signal according to one of the following wireless standards:
   a Bluetooth standard or a variant derived therefrom,
   an Internet Protocol version 6 over Low-Power Wireless Personal Area Networks (6LoWPAN) standard,
   a WirelessHART standard, and
   an Internet Protocol version 6 over Time Slotted Channel Hopping (6TiSCH) standard.

7. The field device adapter according to claim 1, wherein the adapter electronics unit further includes electro-magnetic compatibility (EMC) measures designed to protect at least the first and second supply circuits against EMC interference.

8. The field device adapter according to claim 7, wherein the adapter electronics unit further includes explosion-protection measures, wherein the explosion-protection measures include current-limiting explosion-protection measures and/or voltage limiting measures.

9. The field device adapter according to claim 8, wherein the voltage-limiting measures include at least one higher-current shunt regulator connected in parallel with the first and/or the second supply circuits.

10. The field device adapter according to claim 8, wherein the current-limiting measures include at least one resistor connected between the first supply circuit and the HART modem and/or between the second supply circuit and the wireless module.

11. The field device adapter according to claim 1, wherein the first end of the adapter housing is further designed such that the first end is a closed end, so that the field device adapter and the field device form two mechanical units separate from each other.

12. The field device adapter according to claim 1, wherein the first end of the adapter housing is further designed to mechanically connect the field device adapter to a cable gland connection of the field device so that the field device adapter and the field device form a mechanically connected unit.

13. The field device adapter according to claim 1, wherein the first and second supply circuits in each case have at least one current shunt regulator or at least one diode each which is designed to have a fixed value for the first or second supply voltage.

14. A system of automation technology for capturing and/or setting a process variable, the system comprising:
   a first two-wire line for transferring a loop current with a modulated two-wire signal;
   a field device of automation technology with a field device housing which has at least one housing opening, wherein the field device further comprises a field device electronics unit arranged within the field device housing, the field device electronics unit being designed to communicate data in the form of two-wire signals based upon a Highway Addressable Remote Transducer (HART) standard; and
   a field device adapter for wireless data transfer, the field device adapter including:
      an adapter housing having a first end and a second end, wherein the first end has a first connection element and a second connection element for electrically connecting to the field device electronics unit of the field device, and the second end has a third connection element and a fourth connection element for electrically connecting a two-wire line; and
      an adapter electronics unit arranged in the adapter housing, the adapter electronics unit including:
         a first electrical connection line connecting the first connection element to the third connection element;
         a second electrical connection line connecting the second connection element to the fourth connection element;
         a first supply circuit installed in the first electrical connection line for providing a first supply voltage from a loop current flowing in the first electrical connection line;
         a second supply circuit installed in the second electrical connection line for providing a second supply voltage from the loop current flowing in the second electrical connection line;
         a HART modem based upon the HART standard, wherein the HART modem is connected to the second electrical connection line via a tapping point arranged in the second electrical connection line and wherein the HART modem is configured to: tap a first two-wire signal modulated on the loop current and convert the first two-wire signal into a first universal asynchronous receiver transmitter (UART) signal; convert a supplied second UART signal into a second two-wire signal; and, via the tapping point, modulate the converted second two-wire signal onto the loop current; and
         a wireless module with an antenna for transmitting and receiving, wherein the wireless module is configured to: transmit as a first wireless signal the converted first UART signal supplied by the HART modem; receive a second wireless signal that is to be converted into the second two-wire signal by the HART modem; and supply the received second wireless signal as the second UART signal to the HART modem,
      wherein, in the adapter electronics unit, the first supply circuit is configured to supply the HART modem with the first supply voltage, the second supply circuit is configured to supply the wireless module with the second supply voltage, and the first supply circuit and the second supply circuit are configured to operate independently of each other.

* * * * *